UNITED STATES PATENT OFFICE.

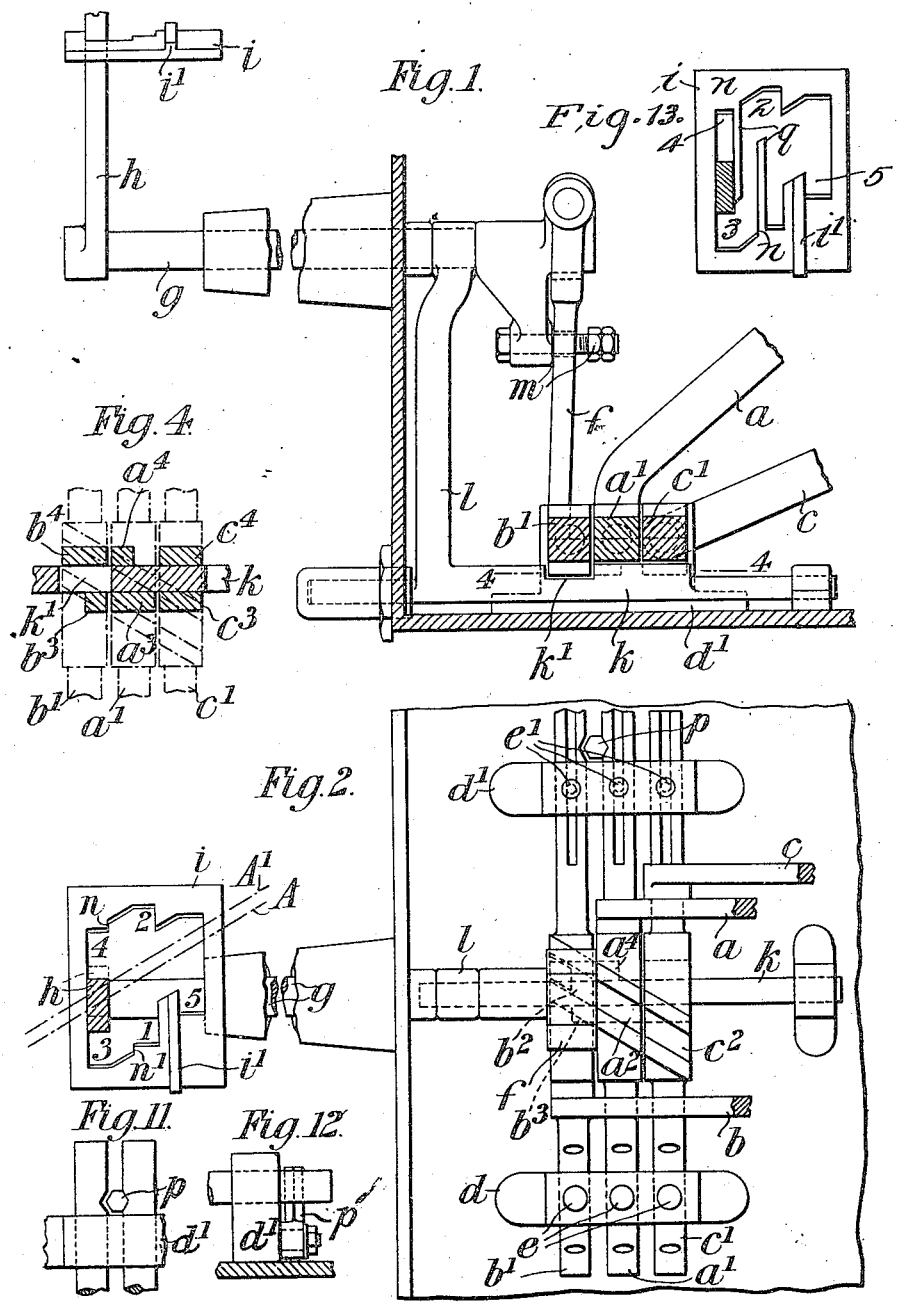

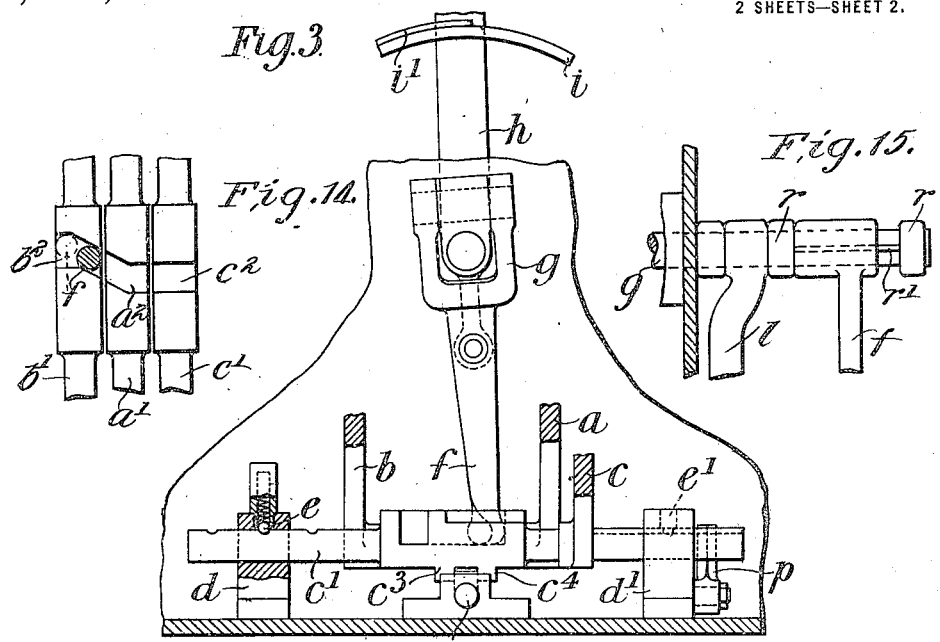
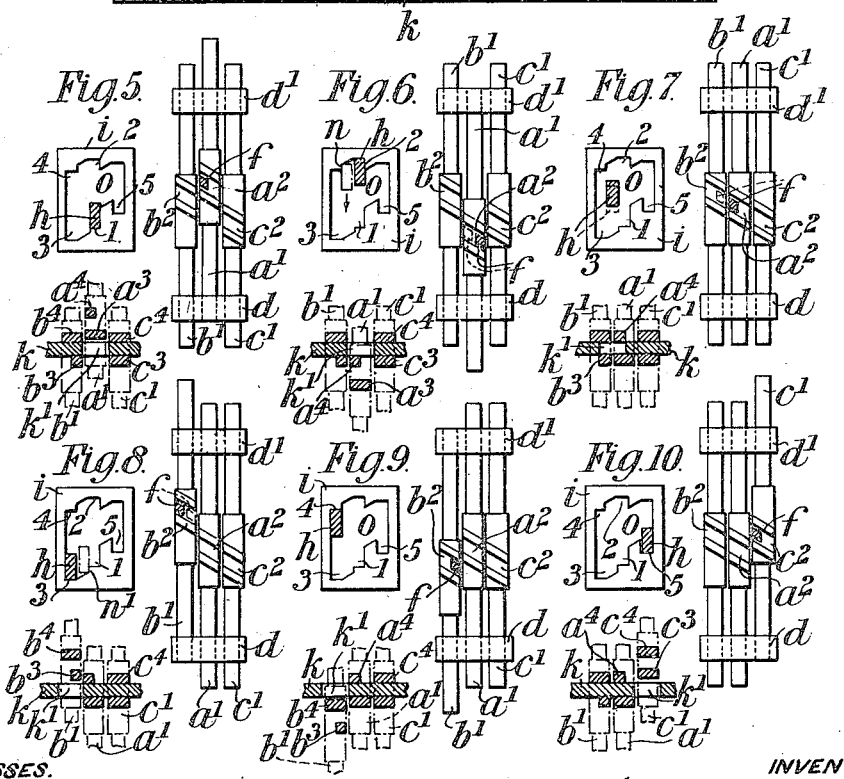

GEORGE HENRY LAIDMAN, OF BULAWAYO, SOUTHERN RHODESIA.

CHANGE-SPEED GEAR FOR POWER TRANSMISSION.

1,151,277.     Specification of Letters Patent.     Patented Aug. 24, 1915.

Application filed December 30, 1914. Serial No. 879,798.

*To all whom it may concern:*

Be it known that I, GEORGE HENRY LAIDMAN, a subject of the King of Great Britain, residing at Bulawayo, Southern Rhodesia, have invented new and useful Improvements in or Connected with Change-Speed Gear for Power Transmission, of which the following is a specification.

My invention relates to change speed gear for power transmission, the apparatus being primarily intended for use in connection with motor vehicles, motor boats, machine tools and the like, although it may be used for other purposes, and to that class of such change gear having three or more speeds, which are brought into operation by the movement of the operating lever in different planes, and wherein the movement of the lever from a position in one plane corresponding to one set of gears to a position in another plane corresponding with another set of gears, can be effected by a continuous movement without a pause such as is necessary when the lever has to pass through a gate or opening as in the well known gate change speed gear.

The object of my invention is to provide improved mechanism of this class and according to my invention I combine with selector rods, (which carry the arms through the medium of which the several sets of gears in the change box are moved, and which are provided with slots for the engagement of a lever for moving the said selector rods) a selector lever which is operated by the change speed lever but which is independent of such change speed lever in so far that it is capable of an automatic movement in a lateral direction from the slot in one selector bar to the slot in an adjacent bar without lateral movement of the change speed lever. This automatic lateral movement of the selector lever may be effected by inclining the slots in the selector rods. The selector rods have arranged in conjunction with the locking mechanism for preventing two of the said rods being moved simultaneously.

To enable my invention to be fully understood I will describe the same by reference to the accompanying drawings, in which:—

Figure 1 is a sectional elevation of change speed gear mechanism constructed according to my invention, and particularly adapted for use in connection with a motor vehicle. Fig. 2 is a plan thereof. Fig. 3 is a sectional elevation at right angles to Fig. 1. Fig. 4 is a horizontal section on the line 4—4, Fig. 1. Figs. 5 to 10 are diagrams illustrating different positions of the change speed lever, selector lever, selector rods, and locking bar. Fig. 11 is a plan of a portion of the locking mechanism of the selector bars, and Fig. 12 is an elevation of the same. Fig. 13 is a plan showing a modified form of quadrant plate. Fig. 14 is a plan showing a modification of the inclined slot in the selector rods. Fig. 15 is an elevation of a modified arrangement of selector lever.

$a$, $b$, $c$ indicate the arms through the medium of which the several sets of gears in the change box are operated in the well known manner, the arm $a$ being for the first and second gears, the arm $b$ for the third and fourth gears and the arm $c$ for the reverse gear, and $a^1$, $b^1$, $c^1$ are the selector rods arranged in accordance with my invention and to which the arms $a$, $b$, $c$ are respectively connected. These selector rods are arranged to slide in bearings $d$, $d^1$ the former of which carries spring stops $e$, $e$, $e$ (one of which is shown in section in Fig. 3) which engage with notches in the ends of the selector rods and serve for holding the said rods in the two geared positions and in the neutral or ungeared position, and enabling the motorist to feel when the gears are properly engaged or disengaged while the other bearing $d^1$ carries keys $e^1$, $e^1$ $e^1$ engaging keyways in the said rods to prevent the latter from rotating.

The selector rods $a^1$, $b^1$, $c^1$ have formed in them slots $a^2$, $b^2$, $c^2$ respectively, the said slots when the selector rods are in their neutral positions being in alinement to form a continuous slot across the top of the said rods as indicated clearly in Fig. 2.

$f$ is the selector lever the lower end of which projects into the said slot, this lever being mounted upon a spindle or shaft $g$ upon which the controlling or change speed lever $h$ is also mounted.

$i$ is the quadrant in conjunction with which the lever $h$ works and which is provided with a series of notches or recesses corresponding to the different positions of the said lever.

In order to prevent more than one of the selector rods from being operated at any one time, I provide in conjunction with the said rods, a locking bar $k$ having a notch or opening $k^1$ which coöperates with a pair of stops $a^3$, $a^4$ on the selector rod $a^1$, a pair of stops $b^3$, $b^4$ on the selector rod $b^1$, and a pair of stops $c^3$, $c^4$ on the selector rod $c$. This locking bar $k$ is connected to an arm $l$ which is pivoted to the shaft $g$ between collars on the latter or mounted in some other way so that it will always partake of the lateral movements of the shaft while allowing the latter to be turned relatively thereto by the lever $h$.

In the arrangement of my invention shown in Figs. 1 to 10, the slots $a^2$, $b^2$, $c^2$ are inclined relatively to the axes of the selector rods, as clearly shown in Fig. 2, and the selector lever $f$ is pivoted upon the spindle $g$, so as to be free to partake of a certain amount of oscillating movement which is determined by the stops $m$, $m$ and which oscillation corresponds with about half the length of the slots in the selector bars and is effected automatically, as hereinafter described.

In the quadrant plate $i$, Fig. 2, the Figs. 1, 2, 3, 4, 5, correspond respectively, with the positions of the change speed lever for the first, second, third, and fourth "forward" speeds and for the "reverse" speed.

The operation of the apparatus as hereinbefore described is as follows:—Assume in the first instance the parts of the mechanism to be in the position shown in Figs. 1, 2 and 3, that is to say, with the slots $a^2$ $b^2$, and $c^2$ in alinement and the lever $h$ in the full line neutral position between the third and fourth speed positions and the end of the selector lever consequently to the left hand of the slot $b^2$. While the parts are in this position it is possible to move the lever $h$ along a neutral diagonal line, indicated by the dotted line A, Fig. 2, so that the selector lever can be moved through the whole length of the inclined slot across the selector bars. Or, assuming the lever $h$ to be in the dotted neutral position as shown in the said figures it can be moved along a neutral diagonal line $A^1$. Assume, now that the said selector lever has been moved along either neutral line to a position in the plate $i$ between the positions 1 and 2 and is then pulled over to position 1, as indicated in Fig. 5. The result of this movement is that the selector bar $a^1$ is operated to throw into gear the first speed gears, the end of the selector lever $f$ being in the left hand side of the slot $a^2$. The longitudinal movement imparted to the spindle $g$ when the lever $h$ was moved along the neutral line brought the notch $k^1$ in the locking bar into coincidence with the stops $a^3$, $a^4$ on the selector bar $a^1$, thereby leaving the said selector bar free to slide backward and forward when the controlling lever $h$ is in position for putting into gear either the first or second speed gears.

Fig. 6 shows the lever $h$ and the selector bar $a^1$ in the second speed position, in which position it will be noticed that the end of the selector lever $f$ has moved from the left to the right hand side of the slot $a^2$, this movement being caused by the action of the inclined walls of the slot on the said lever end. If, now, it is desired to pass from the second speed to the third speed by a simple movement without pause the operation is as follows, that is to say, the lever $h$ is first of all moved from the position shown in full lines in Fig. 6 to that shown in the dotted lines against the stop $n$ on the quadrant plate. The first result of this lateral movement is to move the locking bar $k$ into the position shown in Fig. 7, that is to say, into a position in which the notch $k^1$ is in alinement with the two half stops $b^3$, $a^4$, so that both the selector rods $a^1$ and $b^1$ are for the moment unlocked as regards movement in opposite directions, the selector bar $a^1$ being free to operate for the disengagement of the second speed gears and the selector bar $b^1$ free to operate for the engagement of the third speed gears. When the lever $h$ has been moved to the position shown in dotted lines against the stop $n$, as shown in Fig. 6, which movement also moves the lever $f$ to the dotted line position in the said figure and the movement of the lever $h$ is continued in the direction of the arrow in the said figure, to the position shown in full lines in Fig. 8, the desired change will be effected. When the lever has reached a position about midway between the positions shown in Figs. 6 and 8, that is to say, into the position shown in full lines in Fig. 7, the selector lever $f$ is still in engagement in the selector rod $a^1$; during the slight further movement of the lever $h$ indicated by the dotted lines in Fig. 7, this selector lever, owing to the inclined slots in the selector rods $a^1$, $b^1$ will automatically pass out of engagement with the said rod $a^1$ into engagement with the said rod $b^1$ as indicated respectively in full lines and dotted lines in Fig. 7, so that the change from one rod to the other will be almost instantaneous.

In changing back from position 3 to position 2 the lever $h$ is moved to the dotted position in Fig. 8 against the top $n^1$, when the movement without pause between the positions 3 and 2 will take place. The movement of the lever $h$ from the position shown in full lines in Fig. 8 to the position shown in full lines in Fig. 9 serves to operate the gears for the fourth speed, the selector rod $b^1$ being moved to the position shown in the said figure.

In order to bring the lever $h$ into position 5, corresponding with the gears for the reverse speed, the said lever may be moved successively through the positions 3, 2 and 1, or, it may be moved along the neutral lines A or $A^1$ through the gate $o$, this position of the lever being indicated in Fig. 10. The quadrant $i$ is provided with a rib $i^1$ with which the usual latch (not shown) on the lever $h$ engages when operating the gears for the forward speeds to prevent it passing through the gate $o$. When, however, it is required to engage the reverse speed, the latch is lifted by hand and the lever $h$ can then be passed through the gate $o$ to the position 5.

With the above described arrangement it will be understood that it is possible to make an instantaneous change from a higher to a lower gear, but with the gate systems hitherto used this has not been possible; this quick change from a higher to a lower gear is very advantageous.

In changing from a lower to a higher gear a quick movement of the change speed lever is not always desirable, in fact the existing system of gate change is good enough, but my invention has the advantage that the change to the next higher gear is made positive, whereas in the existing gate system it is quite possible for a driver when intending to go through the gate to carry his lever too far and thus partly or wholly unintentionally strike the wrong gear. This is quite impossible in my invention because the gate, as it were, is passed before the change is made.

It is to be understood that my invention is not limited to the precise construction hereinbefore described as such construction can be considerably modified. As the selector bars $a^1$ and $b^1$ are unlocked by the locking bar $k$ as regards movement in opposite directions when the latter is in the position shown in Fig. 7, it follows that even if either selector bar be moved by the selector lever $f$, the other selector bar will still be unlocked. In order therefore that either of such selector bars shall be locked when the other is moved I may provide additional or supplementary locking mechanism in the form of a locking bolt $p$ Figs. 2 and 3, which mechanism is shown detached in Figs. 11 and 12. This locking bolt is pivoted as shown and arranged between the adjacent selector rods $a^1$, $b^1$ and engages with notches in the said rods, in such manner, that, when one of such selector rods is operated, it holds the said locking bar $p$ in the notch in the other selector rod, thereby securely locking the latter.

It will be understood that owing to the inclination of the slots $a^2$, $b^2$, $c^2$ and the freedom of movement therein of the lower end of the selector lever when the said lever is operated to move one of the selector bars it tends to escape sidewise therefrom but is maintained within the inclined slot in the said rod by the square or enlarged portion of the adjacent selector bar. In the event, however, of it being required to make the movement of the said bars greater than that indicated, the said end of the selector lever would tend when moving a selector bar to engage behind either of the shoulders formed at the ends of the said square portions of one of the other selector bars and prevent the return of the bar moved by the said selector lever. To obviate this disadvantage I may arrange strips of metal between the selector bars with openings for the selector lever to pass from one bar to another when in the neutral position indicated in Fig. 2. Fig. 13 illustrates a modification in the arrangement of the quadrant plate $i$, that is to say, the said plate is provided adjacent to the stops $n$, $n^1$ with guide strips $q$, $q$ which tend to form gates through which the lever will pass, but it will be understood they in no way interfere with the movement of the lever from the postion 2 to the position 3, but simply serve as a guide for the lever in this movement. Of course, these strips $q$, $q$ prevent the movement of the lever along the neutral line A, Fig. 2, but it can be moved to the neutral position if required.

In the arrangement previously described with reference to Figs. 1 to 10, there is a tendency for the selector lever $f$, when moving the selector rod $b^1$ toward the bearing $d$, to travel toward the selector rod $a^1$ and when moving the selector rod $a^1$ toward the bearing $d^1$ its tendency is toward the selector rod $b^1$. The tendency of these movements is prevented by keeping the change speed lever $h$ pressed against the sides of the quadrant $i$, which pressure, however, may prevent an easy operation of the said lever. To overcome this objection the slots in the selector rods can be formed as indicated in Fig. 14, and the selector lever $f$ formed, say, with a ball-shaped or rounded end, as indicated in the said figure. By this arrangement, if the selector lever $f$ is in engagement with the selector rod $b^1$ as shown by the full lines and moves the same toward the bearing $d^1$, the end of the said lever will travel along the inclined portion of the slot $b^2$ into the portion of the said slot at right angles to the rod $b^1$ as indicated by the dotted lines and into contact with one side thereof. On reversing the movement of the lever $f$ it will come into contact with the opposite side of the right angled portion of the slot $b^2$, and there will be no tendency for it to move toward the selector rod $a^1$. When the selector lever $f$ is caused to pass from the selector rod $b^1$ to the selector rod $a^1$, the inclined portions of the slots $b^2$ and $a^2$ will cause it to travel to the right angled portion of the slot $a^2$ into contact with one side thereof, when moving the selector rod $a^1$ toward the bearing $d$. On reversal of this movement, the selector lever will come into contact with the opposite side of the right angled portion of the slot $a^2$, so that there will be no tendency for it to move toward the selector rod $b^1$.

Instead of pivoting the selector lever f to the spindle g as hereinbefore described, it may be arranged to slide between collars r, r fixed to the said spindle, as indicated in Fig. 15, the said lever being prevented from turning on the spindle by a key r¹, or by making the end of the spindle square or of other suitable form.

Having thus described my invention what I desire to secure by Letters Patent is:—

1. In a controlling mechanism of the type described, the combination with a plurality of selector rods to which the gear operating members are connected, a single selective lever therefor adapted to independently operate said selector rods, means controlled by said selective lever and locking those selector rods at neutral which are not operated by said selective lever and unlocking the selector rod which is operated by said selective lever, a controlling lever for said selective lever, means connecting said selective lever and said controlling lever, means provided in said connecting means for permitting said selective lever to move longitudinally independent of said connecting means, and means connecting the selective lever and the rods for automatically imparting said independent longitudinal movement to said selective lever.

2. In a controlling mechanism of the type described, the combination with a plurality of selector rods to which the gear operating members are connected, a diagonal slot formed in each of said rods and providing one continuous slot when the rods are in neutral position, a single selective lever for said rods adapted to engage said slots and independently operate said selector rods, means controlled by said selective lever and locking those selector rods at neutral which are not operated by said selective lever and unlocking the selector rod which is operated by said selective lever, a controlling lever for said selective lever, means connecting said selective lever and said controlling lever, and means provided in said connecting means for permitting said selective lever to move longitudinally independent of said connecting means, whereby a slight oscillatory movement of the controlling lever will cause the selective lever to move laterally in the inclined slots and transfer from one selector rod to another.

3. In a controlling mechanism of the type described, the combination with a plurality of selector rods to which the gear operating members are connected, a single selective lever therefor and adapted to independently operate said selector rods, means controlled by said selective lever and locking those selector rods at neutral which are not operated by said selective lever and unlocking the selector rod which is operated by said selective lever, a controlling lever coöperating with said selective lever, and a shaft to which said controlling lever is rigidly secured and to which said selective lever is pivotally secured.

4. A controlling mechanism comprising a plurality of selector rods to which the gear operating members are connected, a shaft carrying a controlling lever, a selective lever pivoted transversely to said shaft and adapted to independently operate said selector rods, means for regulating the oscillatory movement of said selective lever relative to said shaft, and means controlled by said selective lever and locking those selector rods at neutral which are not operated by said selective lever and unlocking the selector rod which is operated by said selective lever.

5. A controlling mechanism comprising a plurality of selector rods to which the gear operating members are connected, a diagonal slot formed in each of said rods and providing one continuous slot when the rods are in neutral position, a plurality of locking lugs also provided on each of said rods, the locking lugs on one of said rods extending entirely across the same and one of the locking lugs on each of the other rods extending entirely across its respective rod and the other lugs on these last named rods extending only part of the way across its respective rod, a shaft carrying a controlling lever, a selective lever mounted on said shaft and having slight longitudinal movement independent thereof, said selective lever being adapted to engage said slots and independently operate said selector rods, and a locking bar carried by said shaft and provided with a notch of a length sufficient to permit the passage of the locking lugs of each of the selector rods, said bar being adapted to lock the lugs of those selector rods at neutral which are not operated by said selective lever and permit the passage of the selector rod which is operated by said selective lever through said notch.

6. A controlling mechanism comprising a plurality of selector rods to which the gear operating members are connected, a diagonal slot formed in each of said rods and providing one continuous slot when the rods are in neutral position, a plurality of locking lugs also provided on each of said rods, the locking lugs on one of said rods extending entirely across the same and one of the locking lugs on each of the other rods extending entirely across its respective rod and the other lugs on these last named rods extending only part of the way across its respective rod, a shaft carrying a controlling lever, a selective lever mounted on said shaft and having slight longitudinal movement independent thereof, said selective lever being adapted to engage said slots and independently operate said selector rods, a locking bar carried by said shaft and provided with a notch of a length sufficient to permit the passage of the locking lugs of each of the selector rods, said bar being adapted to lock the lugs of those selector rods at neutral which are not operated by said selective lever and permit the passage of the selector rod which is operated by said selective lever through said notch, a notch provided in each of the rods having the short locking lugs, and a pivoted bolt for engaging either of said rods when the other rod is moved.

7. A controlling mechanism comprising a plurality of selector rods to which the gear operating members are connected, a diagonal slot formed in the upper side of each of said rods and providing one continuous slot when the rods are in neutral position, a plurality of locking lugs provided on the underside of each of said rods, the locking lugs on one of said rods extending entirely across the same and one of the locking lugs on each of the other rods extending entirely across its respective rod and the other lugs on these last named rods extending only part of the way across its respective rod, a shaft mounted at an angle to said rods and capable of movement toward and away from said rods, a controlling lever for oscillating and moving said shaft axially, a selective lever pivoted transversely on said shaft and engaging said slots for independently operating said selector rods, a locking bar loosely mounted on said bar and provided with a notch of sufficient length to permit the passage of either of the selector rod locking lugs, said bar being adapted to lock the lugs of those selector rods at neutral which are not operated by said selective lever and permit the passage of the selector rod which is operated by said selective lever through said notch.

GEORGE HENRY LAIDMAN.

Witnesses:
G. CECIL ROBERTS,
M. FREEMAN.